(12) United States Patent  
Terpstra

(10) Patent No.: US 6,428,267 B1
(45) Date of Patent: Aug. 6, 2002

(54) PICK AND PLACE DEVICE HAVING TWO PARALLEL AXES

(75) Inventor: Paul D. Terpstra, Janesville, WI (US)

(73) Assignee: Gilman Engineering & Manufacturing Co., LLC, Janesville, WI (US)

( * ) Notice: Subject to any disclaimer, the term of this patent is extended or adjusted under 35 U.S.C. 154(b) by 0 days.

(21) Appl. No.: 09/164,217

(22) Filed: Sep. 30, 1998

(51) Int. Cl.7 ............................................... B66F 19/00
(52) U.S. Cl. .................... 414/749.6; 212/319; 414/626; 414/917
(58) Field of Search ................................ 212/316, 319; 414/749.1, 749.6, 751.1, 626, 917

(56) References Cited

U.S. PATENT DOCUMENTS

| | | | |
|---|---|---|---|
| 1,835,579 A | 12/1931 | Westin | |
| 3,002,779 A | 10/1961 | Frate et al. | 294/67 |
| 3,065,861 A | 11/1962 | Cruciani | |
| 3,773,185 A | * 11/1973 | Johnson et al. | 212/319 X |
| 4,190,912 A | 3/1980 | Nilsson | 5/83 |
| 4,451,196 A | 5/1984 | Harada et al. | 414/733 |
| 4,599,909 A | 7/1986 | Koller | 74/27 |
| 4,687,400 A | 8/1987 | Lichti | 414/4 |
| 4,740,134 A | 4/1988 | Dixon | 414/733 |
| 4,761,112 A | * 8/1988 | Hammon et al. | 212/319 X |
| 5,086,559 A | 2/1992 | Akatsuchi | 29/834 |
| 5,093,984 A | 3/1992 | Lape | 29/741 |
| 5,105,528 A | 4/1992 | Soth et al. | 29/568 |
| 5,147,160 A | 9/1992 | Reed et al. | 408/3 |
| 5,423,648 A | 6/1995 | Akeel et al. | |
| 5,564,888 A | 10/1996 | Doan | 414/751 |
| 5,803,280 A | * 9/1998 | Mende et al. | 212/319 X |
| 5,836,463 A | * 11/1998 | Khachaturian | 212/270 |
| 5,893,471 A | * 4/1999 | Zakula | 212/316 X |

FOREIGN PATENT DOCUMENTS

| DE | 2457864 | * 6/1976 | 212/316 |
|---|---|---|---|
| SU | 1594124 A1 | * 9/1990 | 212/316 |

OTHER PUBLICATIONS

CAMCO, Sales Brochure for Linear Pick and Place Parts Handlers, 1995, 12 pgs.
Auto–Load, Sales Brochure for Pick and Place Units, Catalog #106, 12 pgs., 1995.

* cited by examiner

Primary Examiner—Janice L. Krizek
(74) Attorney, Agent, or Firm—Foley & Lardner

(57) ABSTRACT

An apparatus and method for picking and placing an object is disclosed. The apparatus includes an elongated frame, first and second carriages slidingly engaged with the frame, first and second connecting rods pivotally engaged with the first carriage at one end and at least a third connecting rod pivotally engaged with the second carriage at one end, and a gripper pivotally and operatively attached to the connecting rods at their other ends. The method of operation includes moving the gripper in a first direction (upwardly) by sliding the first and second carriages away from each other along the frame, moving the gripper in a second direction (laterally), perpendicular to the first direction, by sliding the first and second carriages together along the frame in the same direction, and moving, the gripper in a third direction (downwardly), opposite to the first direction, by sliding the first and second carriages toward each other along the frame.

17 Claims, 9 Drawing Sheets

PICK AND PLACE DEVICE HAVING TWO PARALLEL AXES

FIELD OF THE INVENTION

This invention relates to a device for picking-up a part from a first manufacturing station and thereafter placing and releasing the part in a second station. Such devices are typically used in robotics and automatic manufacturing applications and are commonly referred to as "pick and place" devices or "transfer mechanisms".

BACKGROUND OF THE INVENTION

Pick and place devices known in the art typically incorporate two axes of motion configured perpendicular to each other. For example, two independently operated pneumatic slide carriages can be mounted on axes perpendicular to each other, wherein the first carriage supports the second carriage. The two carriages can be driven either by linear servo motors or by ball screws and rotary servo motors. An example of such a two-axes, two-carriage device is illustrated in U.S. Pat. No. 5,086,559 to Akatsuchi.

The disadvantage of such prior art devices is that the first carriage axis carries the second carriage axis. Therefore, the first axis must robust enough to carry the weight of the part being moved in addition to the weight of the second axis, and the driving force propelling the first axis must be large enough to accelerate and decelerate the part in addition to the second axis. Another disadvantage is that the accuracy of the motion of the second axis depends on the accuracy of the mounting that attaches the second axis to the first axis. If the two axes are not mounted exactly perpendicular to each other, the motion will not have the desired accuracy. Moreover, the mounting is often fixed during manufacturing and cannot be adjusted in the field.

Instead of using two independently powered carriages on two perpendicular axes, some pick and place devices utilize a barrel cam driven by an electric motor, or a pneumatic cylinder moving the carriages in a cam slot. Pick and place devices utilizing U-shaped cam slots are illustrated in U.S. Pat. No. 5,564,888 to Doan, and U.S. Pat. No. 4,740,134 to Dixon. A pick and place machine utilizing a generally Y-shaped cam slot is illustrated in U.S. Pat. No. 4,451,196 to Harada et al.

A primary disadvantage of these cam-type prior art devices is that they provide little, if any, provision for adjustment of the device motion ranges. Typically, the motion of the device is fixed, thereby requiring that the parts handling system be built around the dimensions of the pick and place device. If the pick and place device does not have the exact range of motion specified by the manufacturer, the parts handling system must subsequently be redesigned.

Using another type of transfer apparatus, U.S. Pat. No. 3,065,861 to Cruciani discloses a rope crane having substantially parallel carrying ropes with a pair of blocks connected to one another. By winding the rope of one capstan and paying out the rope of another capstan, the pair of blocks can be carried to any desired point located between two predetermined locations. The main disadvantage of this rope crane is that, since it relies on gravity, it can only exert a positive force in the upward direction (i.e., a "pull force"), and cannot exert a positive force in the downward direction (i.e., a "push force"). The inability to provide a positive pushing force prohibits the device from operating effectively as a pick and place device, particularly if the device is inverted (e.g., located under the automation system).

U.S. Pat. No. 4,687,400 to Lichti discloses another type of device for moving objects in a closed container. This complex device has four degrees of freedom (i.e., up-and-down, back-and-forth, opening and closing the fingers, and rotation around a horizontal axis) but requires manipulation of four arms to obtain the desired motion. Linear horizontal motion is complicated as it requires a combination of vertical and rotational motion. Therefore, it is too complex and expensive for cost-effective use in an application requiring only two degrees of freedom (i.e., up and down, side-to-side).

U.S. Pat. No. 4,190,912 to Nilsson discloses a device for lifting and transferring a hospital patient. Rotation of a lever, pivotally attached to a connecting rod at a predetermined angle, raises, translates, and then lowers a patient in and out of bed. However, due to its design, the range of vertical movement is fixed through the entire lift and transfer cycle (i.e., the mechanism must place at the same level it picks). Thus, this mechanism can-only move from a first predetermined location to another predetermined spot at approximately the same height as the first location, and has limited flexibility.

A need, therefore, exists for a two-axis pick and place device that is simple in construction, highly accurate, programmably adjustable, robust in operation, and yet cost effective.

OBJECTS AND SUMMARY OF THE INVENTION

Accordingly, it is a primary object of the present invention to provide a pick and place device which overcomes the disadvantages previously described.

It is another object of the present invention to provide a pick and place device that can be programmed to move in accordance with the computer instructions of many different manufacturing operations.

It is still another object of the present invention to provide a pick and place device that has carriages which move along two parallel axes instead of two perpendicular axes, to increase the accuracy of movement.

In accordance with one aspect of the present invention, there is provided a pick and place device comprising a single elongate frame extending in a longitudinal direction, first and second carriages slidingly engaged on the frame, first and second motors which drive each of the first and second carriages to slide along the frame, a gripper for gripping an object to be relocated, a first linking arrangement including at least two connecting rods pivotally attached to the first carriage at one end and pivotally attached to the gripper at the other end, and a second linking arrangement including at least one connecting rod pivotally attached to the second carriage at one end and pivotally attached to the gripper at the other end.

In accordance with the present invention, the method of picking and placing an object includes the steps of sliding the first and second carriages away from each other along the frame substantially simultaneously in opposite directions which moves the gripper in an upward direction, sliding the first and second carriages along the frame substantially simultaneously in the same direction which moves the gripper in a lateral direction, and sliding the first and second carriages toward each other along the frame substantially simultaneously in opposite directions which moves the gripper in a downward direction.

In accordance with another aspect of the present invention, there is provided a pick and place device including carriages slidingly engaged with a frame, a platform with an attached gripper, and at least four connecting rods extending between the platform and the carriages, the platform having a first range of motion in a first direction and a second range of motion in a second direction that is substantially perpendicular to the first direction. The first range of motion depends on the length of the frame and the length of the connecting rods. The second range of motion depends on the length of the frame only.

In accordance with still another aspect of the present invention, there is provided a pick and place device comprising an elongate frame extending in a longitudinal direction, a first carriage assembly slidingly engaged with the frame and including at least two pivotally mounted connecting rods, a second carriage assembly, operatively independent from the first carriage assembly, slidingly engaged with the frame and including at least two pivotally mounted connecting rods, a platform pivotally connected to the connecting rods of the first and second carriage assemblies, and a motor which drives each of the first and second carriage assemblies to slide along the frame. Sliding the carriage assemblies along the frame away from each other exerts a force to move the platform in a first direction. Sliding the carriage assemblies along the frame in the same direction exerts a force to move the platform in a second direction which is substantially perpendicular to the first direction. Sliding the first and second carriage assemblies along the frame toward each other exerts a force to move the platform in a third direction, substantially opposite to the first direction.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings in which:

DETAILED DESCRIPTION OF THE PREFERRED EMBODIMENTS

Figure 1:
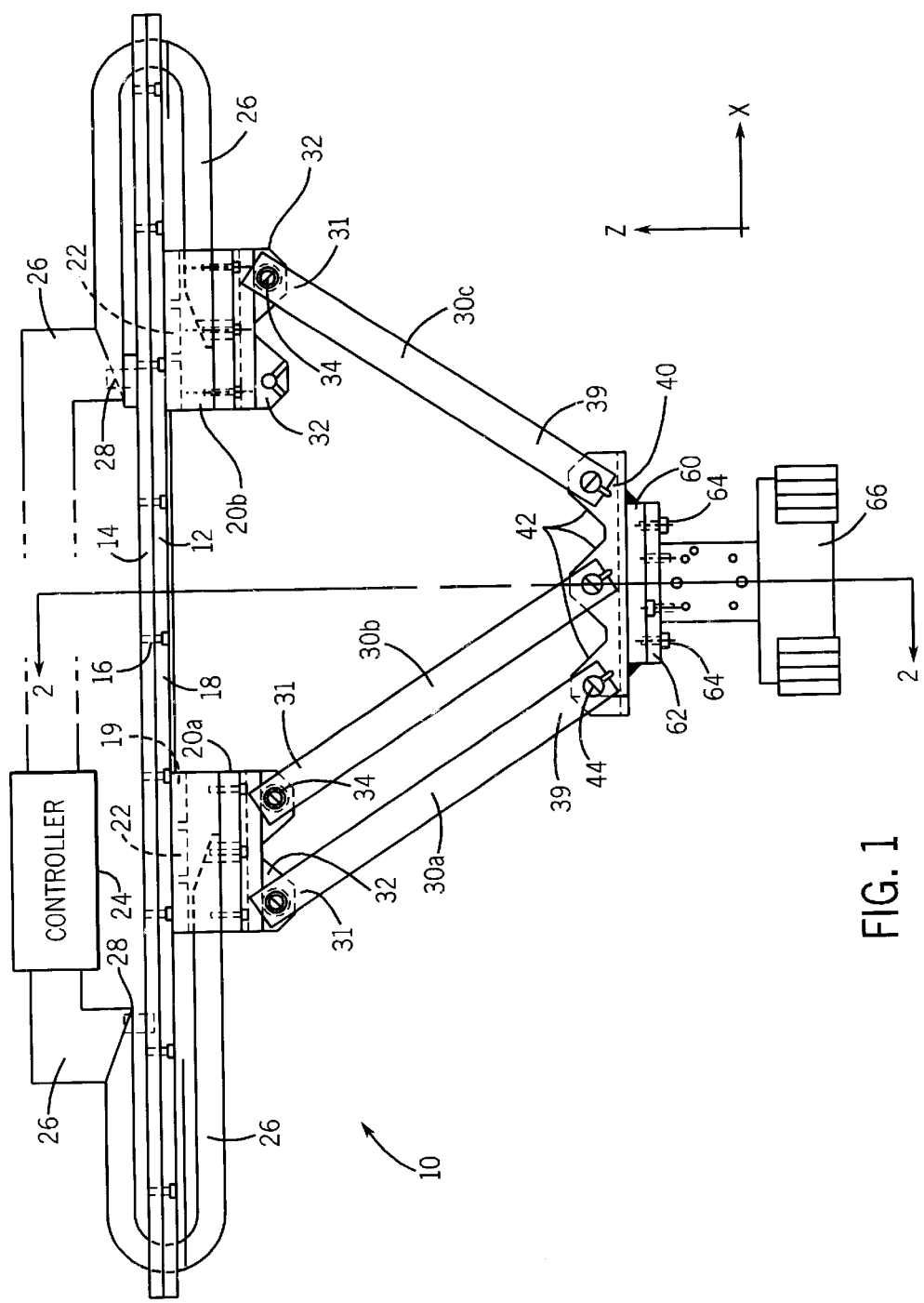
FIG. 1 is a side view of a first embodiment of a pick and place device according to the present invention.
Figure 2:
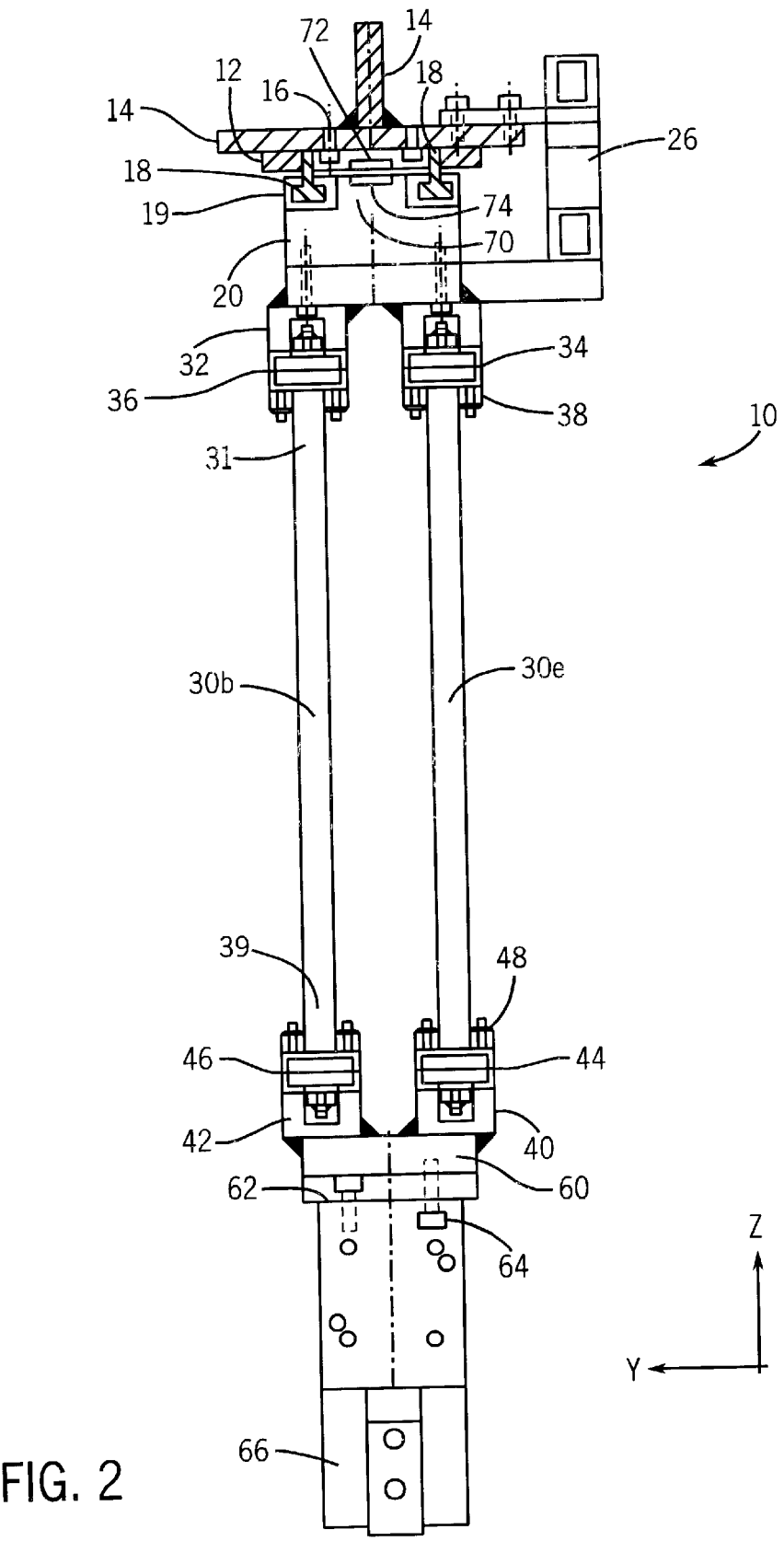
FIG. 2 is a cross-sectional view of the first embodiment of the pick and place device, taken along line II—II of FIG. 1.

FIG. 1 shows a side view of a first embodiment of a pick and place device 10 according to the present invention, while FIG. 2 shows a cross-sectional view taken across lines II—II of FIG. 1. In this embodiment, support frame 12 is mounted to an overhead structure 14 using fasteners 16, illustrated here as mounting bolts. The fasteners may alternatively include screws, rivets, or welding.

In FIG. 1, the support frame 12, extends overhead in a longitudinal direction and provides at least one single axis bearing rail 18 on which two independent carriages 20a and 20b slide. Bearing rail 18 extends outwardly from support frame 12, and each carriage 20 includes at least one bearing 19 which engages the bearing rail 18 for smooth sliding of carriages 20 along the rail.

A motor 22 is contained within and drives each of the carriages 20. In a preferred embodiment, the motor is a linear servo motor, but may include other suitable drive means such as a ball screw and rotary servo motor, or timing belt drive and rotary servo motor. The motors 22 driving the two independent carriages 20 may be controlled using a computer numerical control (CNC) controller 24 or any other two-axis controller. CNC controller Model No. 8000 available from Giddings & Lewis, Inc. of Fond du Lac, Wis., may be used to control motors 22. The power connection to the motors 22 are made to carriages 20 by cable carriers 26 which allow carriages 20 to slide along bearing rail 18 without tangling or breaking of the wires. Cables are connected at one end to the controller 24 and at the other end to the motor 22 of each carriage 20. The cable carriers 26 are attached to support frame 12 by cable carrier fasteners 28, illustrated here as mounting bolts. The fasteners may alternatively include screws, rivets, or other suitable attachments. Carriages 20 are driven by the motors 22 back and forth along a single axis in the longitudinal direction of support frame 12. Therefore, carriages 20 each have one degree of freedom, i.e., side-to-side in FIG. 1.

The pick and place device 10 of the present invention also includes a plurality of connecting rods 30. One end 31 of each of the connecting rods 30 is pivotally connected to one of the carriages 20 by mounting to a flange 32 of the carriage 20, using a pivot joint 34. Each pivot joint 34 preferably includes a bearing 36, e.g., a ball bearing or a block bearing, for smooth pivoting, and may also include bearing fasteners 38, e.g., set screws, hex nuts, or bolts. In the embodiment of FIG. 1, each carriage 20 has four flanges 32, arranged in two rows each having two adjacent aligned flanges as shown. Flanges 32 of each carriage 20 are preferably formed integrally with the carriage, either as a monoblock structure or by welding a flange member to the carriage.

The other end 39 of each of the connecting rods 30 is pivotally mounted to a platform 40. In the embodiment shown in FIG. 1, platform 40 has six flanges 42, arranged in two rows each having three adjacent aligned flanges as shown. Connecting rods 30 are mounted to flanges 42 using a pivot joint 44, preferably including a bearing 46, e.g., a ball bearing or a block bearing, and may also include bearing fasteners 48, e.g., set screws, hex nuts, or bolts. Flanges 42 of platform 40 are also formed integrally with the platform, either as a monoblock structure or by welding.

At least three connecting rods 30 are required to control the parallelism of the platform to the support frame. More connecting rods 30 may be used to increase stability of the platform 40 and/or allow transfer of heavier loads. It is important to note that all of the connecting rods should not be in a single line (i.e., linear alignment), but instead should be mounted to platform 40 such that they provide a stable transfer force that does not allow undesirable twisting forces across the plane of platform 40.

In the embodiment shown in FIGS. 1 and 2, four connecting rods 30a, 30b, 30d (located directly behind 30a in FIG. 1), and 30e (located directly behind 30b), are pivotally mounted to the first carriage 20a and to platform 40. Two additional connecting rods 30c, 30f (located directly behind 30c), are pivotally mounted to the second carriage 20b and to the platform 40.

Figure 3A:
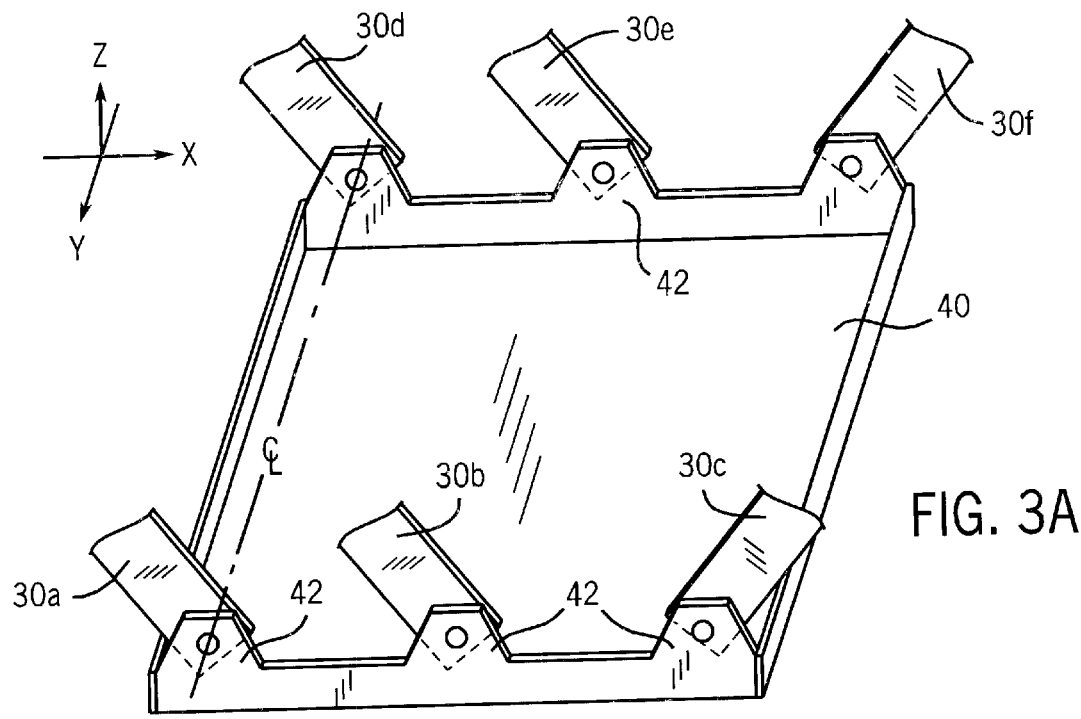
FIGS. 3A–3D are perspective views that schematically illustrate different embodiments of the mounting configuration for the platform of FIG. 1.

FIGS. 3A–3F show perspective views of the platform 40, indicating schematically how the connecting rods 30 are configured on the flanges of platform 40. In FIG. 3A, the six connecting rods 30a–f are configured as shown in FIGS. 1 and 2, i.e., arranged along the perimeter of the platform 40 in two rows each having three connecting rods. Four connecting rods 30a, 30b, 30d, 30e are connected to the first carriage 20a in order to keep platform 40 level with respect to the support frame 12, while only two connecting rods 30c, 30f are required to be connected to the second carriage 20b. Note that less than six connecting rods can be used. Since three points define a plane, using only connecting rods 30a, 30c, and 30e would represent one example of the minimum number of rods needed to keep the platform 40 level. Note that using connecting rods 30a, 30c, and 30d would not keep the platform level, since rods 30a and 30d are connected along a centerline that is perpendicular to the axis of motion (+/−X direction). With only three connecting rods, the two rods from the same carriage cannot be mounted along such a perpendicular centerline.

Figure 3B:
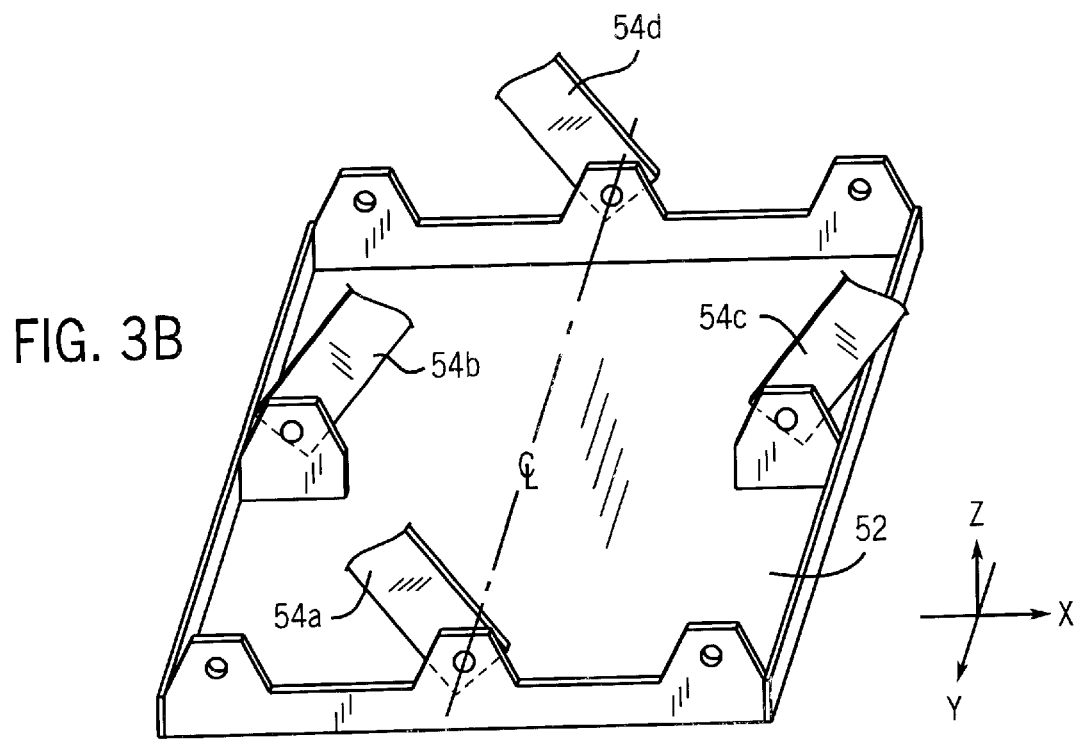

FIG. 3B illustrates a second embodiment for the mounting configuration of the connecting rods 30 to a different platform 52. In this embodiment, only four connecting rods 54a, 54b, 54c, and 54d are used to support platform 52 as shown. Note that this four-point support, arranged in three rows of one-two-one rods each, still serves to keep the platform 52 level because the two connecting rods 54a, 54d are mounted at opposite edges of the platform and configured to straddle the perpendicular centerline of the other two connecting rods 54b, 54c as shown. If either connecting rod 54b or 54c from carriage 20b were removed, the platform 52 could tilt around the centerline. If, however, either one of connecting rods 54a or 54d from carriage 20a were removed, the platform would not tilt because the connecting rods 54b and 54c from the same carriage 20b would prevent it. For heavier loads, a three-point mounting configuration using connecting rods 54a, 54b, and 54c would tend to twist the platform, since rod 54a is moving along a different parallel axis than rods 54b and 54c. Hence, a four-point mounting configuration is used to minimize twisting forces.

Figure 3C:
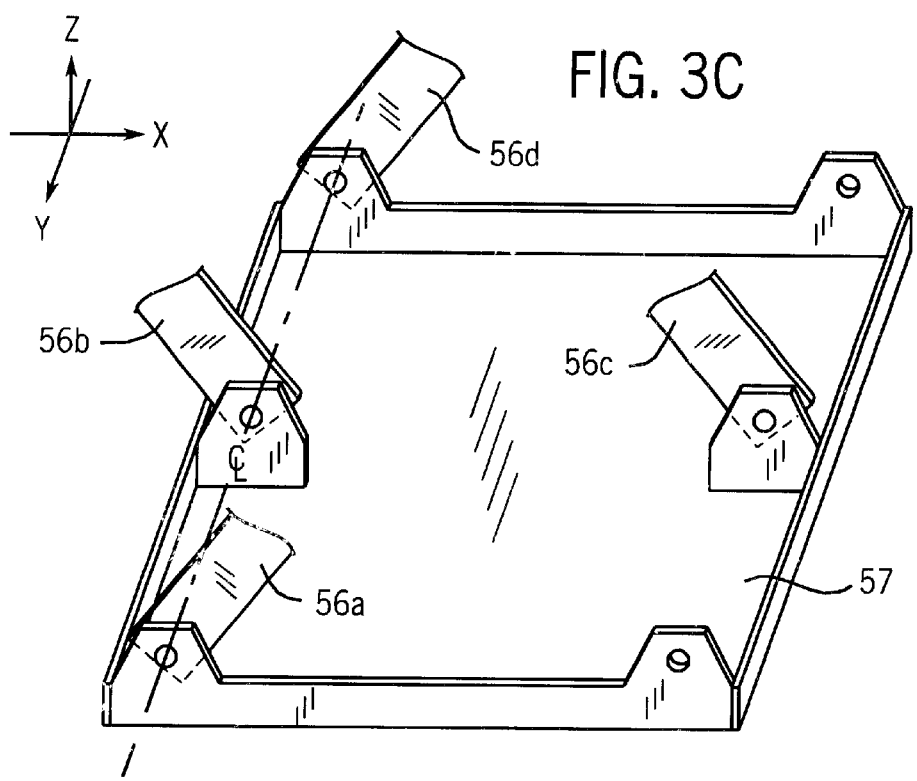

FIG. 3C illustrates a third embodiment of the connecting rod mounting configuration. In this embodiment, four connecting rods 56a, 56b, 56c, and 56d are used to support platform 57 and arranged as three rows of one-two-one connecting rods each as shown. Note that at least one of two connecting rods from the same carriage are not mounted on the centerline between the other two connecting rods, i.e., rod 56c is not mounted in line with rods 56a, 56b, and 56d. This configuration keeps the platform 57 from tilting around the centerline. If either connecting rod 56b or 56c were removed, the platform would tilt.

Figure 3D:
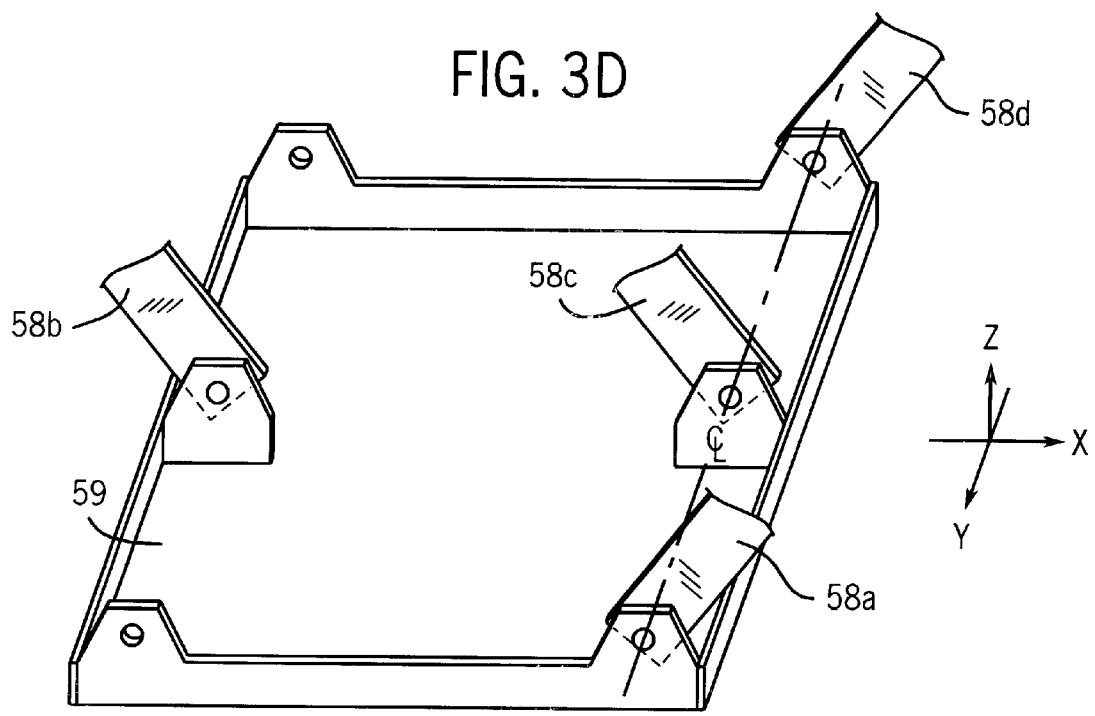

FIG. 3D illustrates a fourth embodiment for the platform mounting configuration. In this embodiment, the four connecting rods 58a, 58b, 58c, and 58d are used to support platform 59. Again note that at least one of the two connecting rods from the same carriage are mounted off of the perpendicular centerline in order to counteract the tilting forces applied to the platform by the other connecting rods.

Again referring to FIGS. 1 and 2, a mounting plate 60 is fastened to the bottom surface of the platform 40, preferably by welding. An adapter plate 62 is fastened to the mounting plate 60 by fasteners 64, illustrated as mounting bolts. In the embodiment shown here, a pneumatic gripper 66 is mounted to adapter plate 62. The use of adapter plate 62 increases the versatility of the pick and place device 10 of the present invention by allowing a number of different grippers 66, including mechanical, pneumatic, and magnetic grippers, to be used with the pick and place device as desired. One example of a mechanical gripper which could be used with the pick and place device 10 is Model No. RPL-3 available from Robohand, Inc. of Monroe, Conn.

In the embodiment of FIG. 1, a linear servo motor 70 is used on each carriage 20. As can best be seen in FIG. 2, the magnets of a motor stator 72 extend along the longitudinal axis between support frame 12 and a motor coil or windings 74 attached to each carriage. The motor stator 72 is fastened to the support frame 12 by adhesive. Hence, using a linear servo motor, the stator 72 is fixed to the support frame and the motor coil 74 propels the carriage along the frame. One example of a linear servo motor which could be used with the present invention is The MegaThrust Series "Y" linear motor available from NSK Corporation of Ann Arbor, Mich.

Figure 4A:
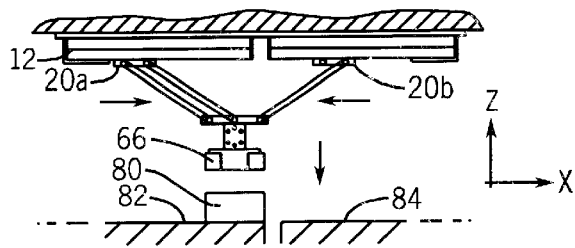
FIGS. 4A–4F are side views illustrating various positions during the operation of the pick and place device in accordance with the present invention.

FIGS. 4A through 4F illustrate the movement of the pick and place device 10 of the present invention during its operation. In FIG. 4A, the pick and place device is shown in an initial position wherein the platform 40 is raised above an object 80 to be moved. In the example shown in FIGS. 4A–4F, the object 80 is being moved from one station, such as a first conveyor belt 82, to another station, such as a work fixture 84.

Figure 4B:
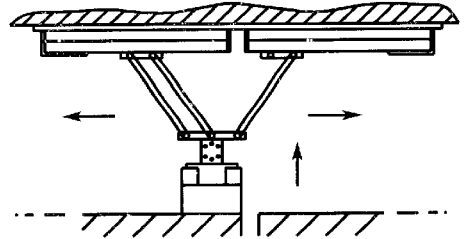

In a first step, the two independent carriages 20 are moved along the longitudinal axis of the support frame 12 (X axis) toward each other such that the platform 40 is lowered, along the axis perpendicular (Z axis) to the axis of the support frame, to the position shown in FIG. 4B.

The gripper 66 is then activated to "pick" the desired object 80.

Figure 4C:
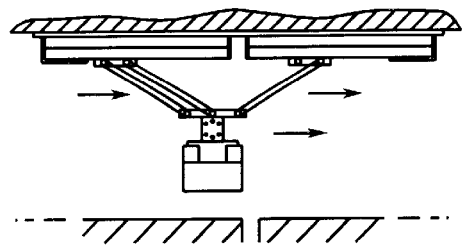

In a second step the two independent carriages 20 are moved along the longitudinal axis of the support frame 12 away from each other such that the platform 40 is raised to the position shown in FIG. 4C to raise the object. The gripper 66 remains activated. The range of motion of the platform 40 as it is raised and lowered is limited by the length of the support frame 12 and the length of the connecting rods 30.

Preferably, in the first and second steps, the two independent carriages 20 move along the longitudinal axis of the support frame 12 at substantially the same speed. However, if the two independent carriages do not move at the same speed, the platform will be displaced along the longitudinal axis of the support frame (i.e., horizontally) instead of only being displaced perpendicular to the longitudinal axis of the support frame (i.e., vertically). Although it is generally desirable that the platform be displaced solely along the vertical axis during the raising and lowering of the platform to "pick" the load (since it is easier to program and control), it may be determined that some horizontal motion may be advantageous in some applications.

Figure 4D:
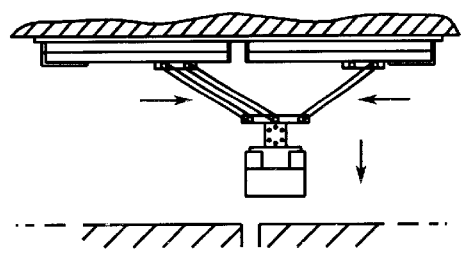

In a third step, the two independent carriages 20 move along the support frame in the same direction at substantially the same speed such that the load is transferred along the longitudinal direction of the support frame 12 to a desired position as shown in FIG. 4D. The range of motion of the platform along this longitudinal axis is limited only by the length of the support frame. As before, if the two independent carriages do not move along the longitudinal axis of the support frame (i.e., horizontally) at the same speed, the platform will be displaced in a direction perpendicular to the longitudinal axis of the support frame (i.e., vertically) as it is moved along the longitudinal axis. Again, although it is generally desirable that the platform be displaced solely along the longitudinal axis of the support frame during transfer of the load, some applications may require simultaneous movement along both the vertical axis and the horizontal axis. In such a case, the path of the platform (and object) would be diagonal or curved instead of coincident with the X and Z axes.

Figure 4E:
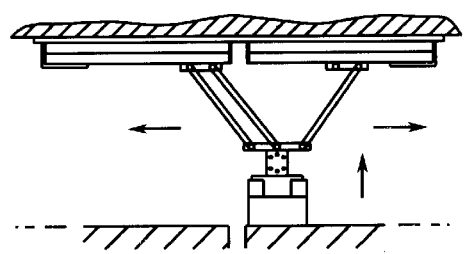

In a fourth step, the two independent carriages 20 are again moved toward each other along the longitudinal axis of the support frame 12 to again lower the platform to the position as shown in FIG. 4E. The gripper is then deactivated to "place" the desired object in a particular location.

Figure 4F:
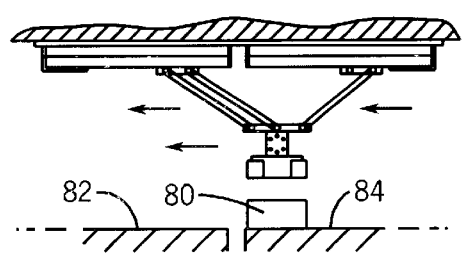

In a fifth step, after placing the load, the two independent carriages 20 are again moved away from each other along the longitudinal axis of the support frame to again raise the platform to the position as shown in FIG. 4F. The gripper remains deactivated. Preferably, in the fourth and fifth steps, the two independent carriages move along the longitudinal axis of the support frame at the same speed, unless otherwise required for particular applications.

In a sixth step, the two independent carriages 20 are moved along the support frame in the same direction such that the platform is returned to its starting position as shown in FIG. 4A. Following return of the pick and place device to its starting position, the operation illustrated in FIGS. 4A–F is repeated for each object to be transferred.

Figure 5:
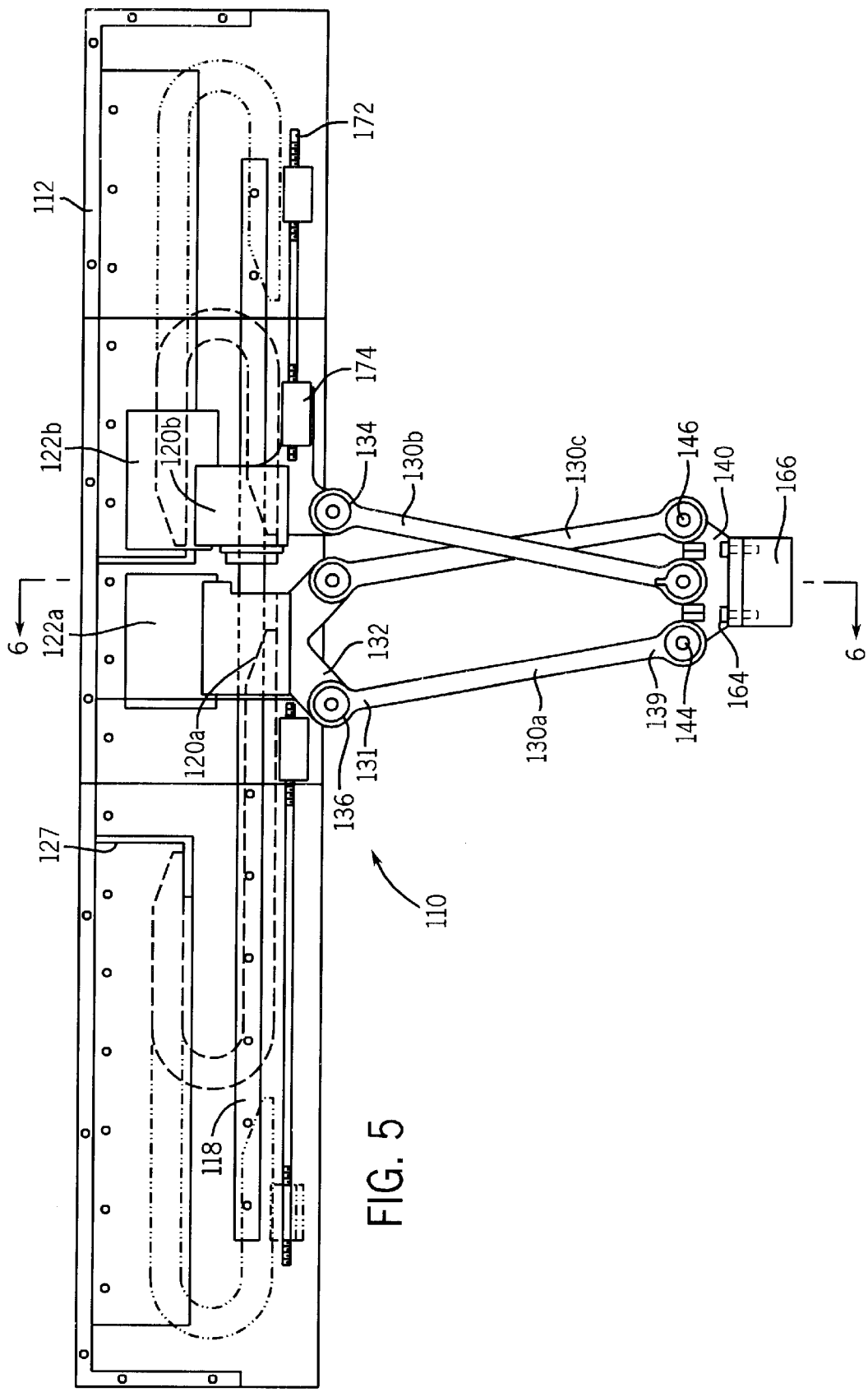
FIG. 5 is a side view of a second embodiment of a pick and place device of the present invention.
Figure 6:
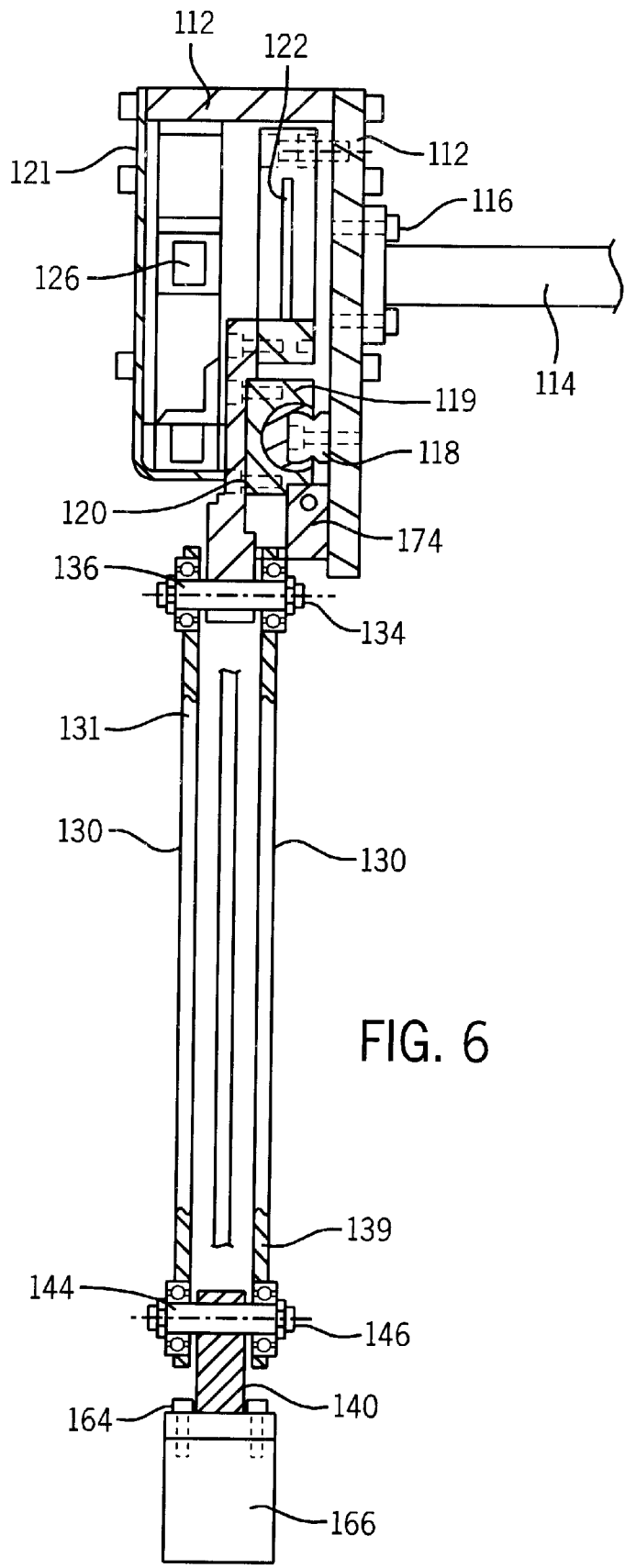
FIG. 6 is a cross-sectional view of the second embodiment of the pick and place device, taken along line VI—VI of FIG. 5.

FIG. 5 is a side view of a second embodiment of a pick and place device 110 of the present invention, and FIG. 6 is a cross-sectional view thereof taken across lines VI—VI of FIG. 5. Support frame 112 is mounted to a mounting structure 114 using fasteners 116, again illustrated here as mounting bolts. The fasteners may alternatively include screws, rivets, or welding. As shown above in FIGS. 1 and 2, the support frame 112 extends overhead in a longitudinal direction and provides a bearing rail 118 on which two independent carriages 120 are mounted. In this embodiment, the bearing rail 1 18 extends laterally from the support frame 112, and each carriage 120 includes at least one bearing 119 which engages the bearing rail 118 for smooth sliding of carriages 120 along the rail. A front cover 121 is fastened to the support frame 112.

A motor 122 is again operatively connected to and drives each of the carriages 120. The motors 122 are controlled through cable carriers 126 which allow carriages 120 to slide along the bearing rail 118. In this embodiment, each cable carrier 126 is connected at one end to a controller (not shown) and at another end to the motor 122 of each carriage 120. The carriers 126 are mounted to support frame 112 by a mounting bracket 127.

The pick and place device 110 also includes at least three connecting rods 130. One end 131 of each of the connecting rods 130 is pivotally connected to one of the carriages 120 by mounting to a flange 132, using a pivot joint 134, preferably including a bearing 136 (e.g., a ball bearing or a block bearing) for smooth pivoting. Each carriage 120 has two flanges 132. Flanges 132 of each carriage 120 are formed integrally with the carriage, either as a monoblock structure or by welding. The other end 139 of each connecting rod 130 is pivotally mounted to a platform 140.

Figure 7A:
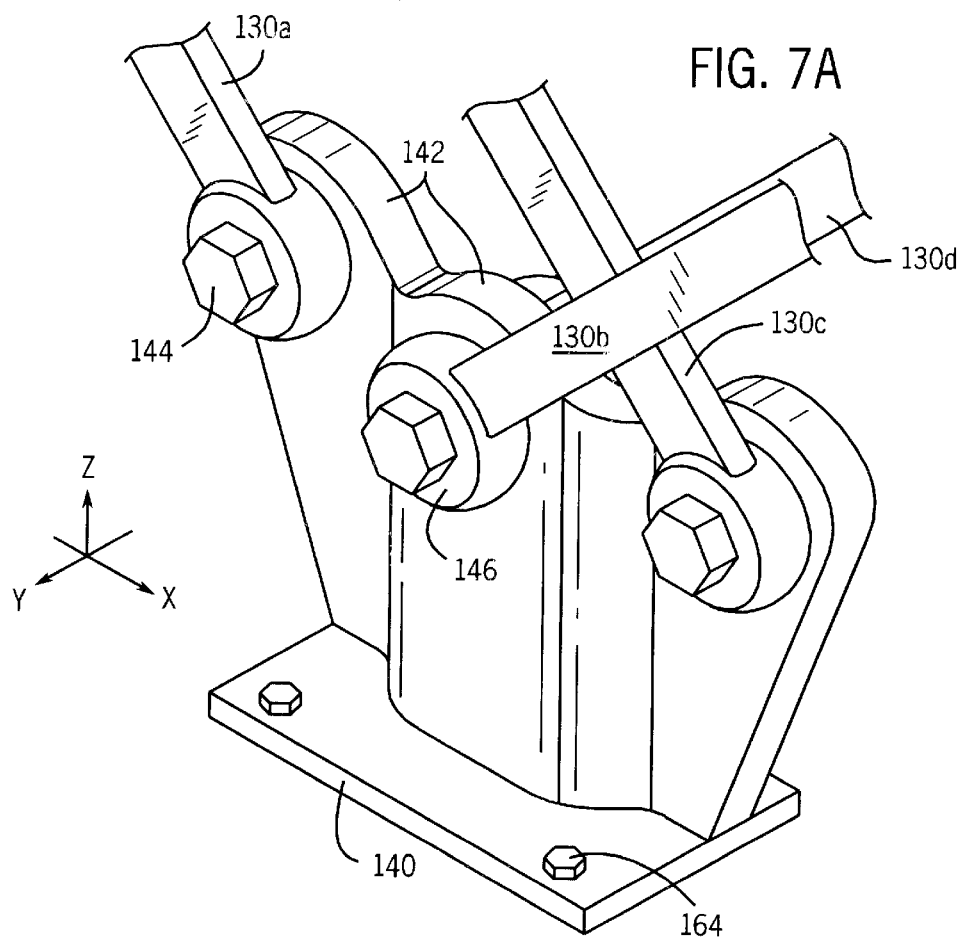
FIGS. 7A and 7B are perspective and top views, respectively, that schematically illustrate the mounting configuration for the platform of FIG. 5.
Figure 7B:
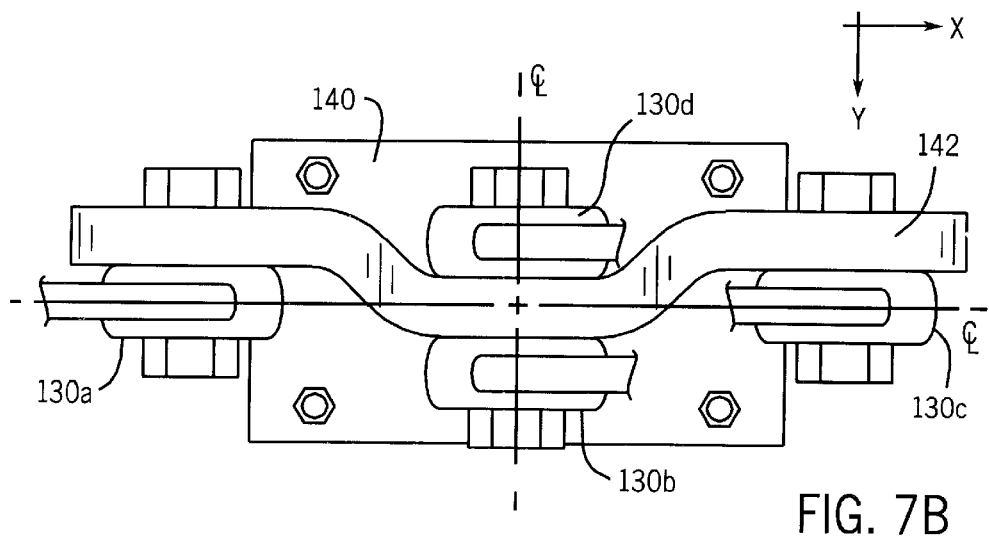

In the embodiment shown in FIGS. 7A and 7B, platform 140 has four flanges 142. Connecting rods 130 are mounted to flanges 142 using a pivot joint 144, preferably including a bearing 146 (e.g., a ball bearing or a block bearing) for smooth pivoting. Flanges 142 of platform 140 are formed integrally with the platform, either as a monoblock structure or by welding. An adapter plate (not shown) may also be used, if desired. A gripper 166 is mounted to a bottom surface of platform 140 by fasteners 164, illustrated as mounting bolts. The fasteners may alternatively include screws, rivets, or welding.

As stated above, at least three connecting rods are required. More connecting rods may be used to increase stability of the device and/or allow transportation of heavier loads. It is important that all of the connecting rods are mounted to platform 140 such that they provide a stable lifting force which does not allow undesirable twisting forces across the plane of the platform. Hence, FIG. 7B shows a top view of platform 140, indicating how the four connecting rods 130*a–d* are mounted on flanges 142 of platform 140. Accordingly, two X-axis aligned connecting rods 130*a*, 130*c*, are pivotally mounted to the first carriage 120*a* and to platform 140. Two additional Y-axis aligned connecting rods 130*b*, 130*d*, are pivotally mounted to the second carriage 120*b* and to platform 140. This symmetrical connecting rod arrangement provides the proper lifting forces without exerting undesired twisting forces on the platform.

In the embodiment of FIG. 5, an encoder scale 172 extends along substantially the entire length of the support frame 112 and is used, with encoders 174 located on each of the carriages 120, to track the position of each carriage along the support frame 112. The motors 122 driving independent carriages 120 may be controlled using computer numerical control (CNC) or any other two-axis control devices. Therefore, the location of each carriage 120 along the support frame 112 is communicated to the control device by the respective encoder 174. Encoder Model No. RGH 22, available from Renishaw, Ltd., U.K., may be used to provide this function.

Figure 8:
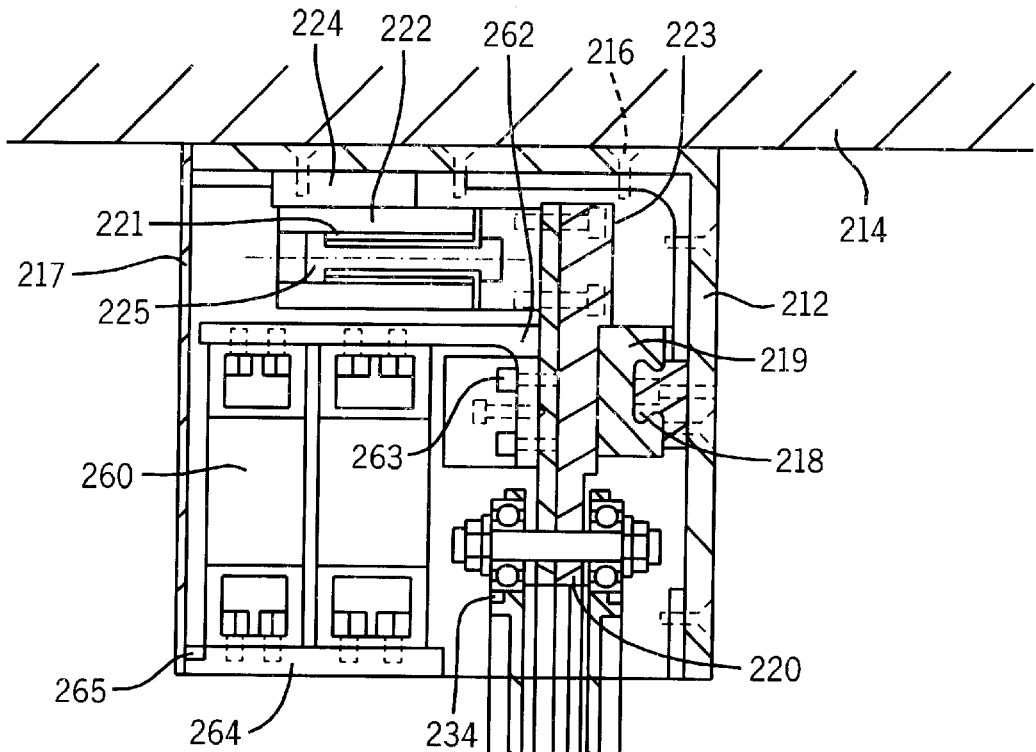
FIG. 8 is a cross-sectional view of another embodiment of the pick and place device of the present invention, illustrating an angle frame configuration for mounting to an adjacent structure.

FIG. 8 illustrates a cross-sectional side view of a third embodiment 210 of the pick and place device of the present invention, which uses an angle frame 212 mounted to an adjacent structure 214 using fasteners 216, illustrated as mounting bolts. The fasteners may alternatively include screws or rivets. A front cover 217 is also mounted to the angle frame 212. At least one bearing rail 218 is mounted to the angle frame 112 to provide sliding support for the carriage 220 as shown.

In this embodiment, a linear motor 222 is used to move each carriage 220. A motor magnet 221 is mounted to angle frame 212 using fasteners 223, illustrated as mounting bolts. A spacer 224 is provided between motor magnet 221 and angle frame 212. A motor coil 225 extends from each carriage 220 into motor magnet 221. Each carriage 220 includes a bearing 219, illustrated as a block bearing, which engages a bearing guide for smooth sliding of carriages 220 along bearing rail 218. Cable carriers 260 are mounted to an angle bracket 262 using fasteners 263. A plate support 264 is mounted to front cover 217 by fasteners 265. Cable carriers 260 are also mounted to support plate 264.

As before, connecting rods 230 are pivotally mounted at one end 231 to the carriage 220 using pivot joints 234, and at the other end 239 to platform 240 using pivot joints 244. A gripper 266 is mounted either to an adapter plate (not shown) or to the bottom surface of platform 240 using fasteners 265, illustrated as mounting bolts.

In review, it can now be seen that the present invention provides an improved two-axis pick and place device that is more efficient in construction and operation than previous designs. The present invention provides a highly accurate, programmably adjustable, robust machine that can easily be controlled using conventional two-axis controllers. It is the interconnecting linkage between the two independent carriages and the gripper that translates motion along a longitudinal axis, such as the horizontal axis, into motion perpendicular to that axis, such as the vertical axis.

While specific embodiments of the present invention have been shown and described herein, further modifications and improvements may be made by those skilled in the art. In particular, it should be noted that more than three connecting rods can be used to provide additional load-handling capabilities and machine stiffness. Also note that most any type of pick and place gripper and/or platform could be substituted for those shown in the figures. Furthermore, while the invention has been described using an individual motor to control each independent carriage, it should be recognized that a single motor in conjunction with various types of linkages and drives could control two carriages. Numerous other hardware and software modifications may also be made to customize the present invention for various other applications. All such modifications which retain the underlying principles disclosed and claimed herein are within the scope of the invention.

What is claimed is:

1. A pick and place device comprising:
   an elongated frame having a major axis;
   a first carriage and a second carriage slidingly engaged with the elongated frame and each having only one degree of freedom;
   a pickup head;
   at least three connecting rods extending between the pickup head and the first and second carriages;
   the pickup head having a first degree of freedom along a first axis substantially parallel to the major axis of the frame, and a second degree of freedom along a second axis, substantially perpendicular to the first axis, wherein movement of the carriages only along the major axis is translated by the connecting rods into movement of the pickup head along both the first and second axes.

2. The pick and place device according to claim 1, further comprising at least one motor for driving each of the first and second carriages independently of the other carriage, the at least one motor being under the control of a position controller.

3. The pick and place device according to claim 1, wherein moving the first and second carriages apart brings the pickup head closer to the frame.

4. The pick and place device according to claim 3, wherein shifting the first and second carriages in the same direction moves the pickup head parallel to the frame.

5. The pick and place device according to claim 1, wherein at least two connecting rods extend between each of the first and second carriages and the pickup head.

6. An apparatus for moving an object, comprising:
   an elongate frame extending in a longitudinal direction;
   a first carriage assembly slidingly engaged to move along the frame and including a first pivotally mounted connecting rod;
   a second carriage assembly slidingly engaged to move along the frame operatively independently from the first carriage assembly and including second and third pivotally mounted connecting rods;
   a head assembly pivotally mounted to the first, second and third connecting rods of the first and second carriage assemblies; and
   at least one motor configured to independently drive each of the first and second carriage assemblies to slide along the frame,
   wherein moving the carriage assemblies along the frame away from each other exerts a force to move the head assembly in a first direction, moving the carriage assemblies along the frame in the same direction exerts a force to move the head assembly in a second direction which is substantially perpendicular to the first direction, and moving the carriage assemblies along the frame toward each other exerts a force to move the head assembly in a third direction which is opposite to the first direction.

7. The apparatus according to claim 6, comprising at least four connecting rods, at least two being pivotally mounted to each of the first and second carriage assemblies.

8. The apparatus according to claim 6, wherein the connecting rods are pivotally mounted to the head assembly in such a manner that the orientation of the head assembly with respect to the elongate frame remains constant throughout the operation of the apparatus.

9. The apparatus according to claim 8, wherein the at least one motor drives the two carriage assemblies at substantially the same rate of speed such that the head assembly moves in paths that are orthogonal to the frame.

10. The apparatus according to claim 8, wherein the at least one motor drives the two carriage assemblies at substantially different rates of speed such that the head assembly moves in paths that are not only orthogonal to the frame.

11. A transfer device comprising:
    at least one rail member extending in a longitudinal direction;
    first and second carriages slidingly engaged with the at least one rail member;
    first and second motors adapted to independently drive each of the first and second carriages to slide along the at least one rail member;
    a platform;
    a first linking arrangement including a first connecting rod having first and second ends, the first connecting rod pivotally attached to the first carriage at the first end and pivotally attached to the platform at the second end; and
    a second linking arrangement including second and third connecting rods having first and second ends, each of the second and third connecting rods pivotally attached to the second carriage at the first end and pivotally attached to the platform at the second end,
    wherein the platform is transferred from one position to another position that can be a different distance from the at least one rail member when at least one of the carriages slides along the at least one rail member.

12. The transfer device as claimed in claim 11, wherein the first and second linking arrangements, combined, include at least four connecting rods.

13. The transfer device as claimed in claim 11, wherein the second connecting rod is attached to the second carriage at a different pivot location than the third connecting rod attached to the second carriage.

14. The transfer device as claimed in claim 11, further comprising a gripping device mounted to the platform.

15. The transfer device as claimed in claim 11, wherein the rail member comprises first and second rails in parallel alignment, and wherein the first and second carriages are slidingly engaged with the first and second rails, respectively.

16. The transfer device as claimed in claim 11, wherein the first, second, and third connecting rods are attached to the platform in such a manner that the platform remains parallel to the rail member throughout the operation of the transfer device.

17. The transfer device as claimed in claim 11, further comprising a programmable position controller for controlling the first and second motors.

* * * * *

UNITED STATES PATENT AND TRADEMARK OFFICE
CERTIFICATE OF CORRECTION

PATENT NO.     : 6,428,267 B1
DATED          : August 6, 2002
INVENTOR(S)    : Terpstra It is certified that error appears in the above-identified patent and that said Letters Patent is hereby corrected as shown below:

Column 1,
Line 24, "must robust" should be -- must be robust --.

Column 2,
Line 16, "can-only" should be -- can only --.

Column 7,
Line 39, "1 18" should be -- 118 --.

Signed and Sealed this

Eleventh Day of March, 2003

JAMES E. ROGAN
*Director of the United States Patent and Trademark Office*